B. H. SMITH.
MOTOR VEHICLE.
APPLICATION FILED DEC. 27, 1917.

1,370,374.

Patented Mar. 1, 1921.
2 SHEETS—SHEET 1.

INVENTOR
Bronson H. Smith
BY
Marshall L. Dearborn
ATTORNEYS

B. H. SMITH.
MOTOR VEHICLE.
APPLICATION FILED DEC. 27, 1917.

1,370,374.

Patented Mar. 1, 1921.
2 SHEETS—SHEET 2.

INVENTOR
Bronson H. Smith
BY
Marshall & Dearborn
ATTORNEYS

UNITED STATES PATENT OFFICE.

BRONSON H. SMITH, OF BROOKLYN, NEW YORK.

MOTOR-VEHICLE.

1,370,374.   Specification of Letters Patent.   Patented Mar. 1, 1921.

Application filed December 27, 1917. Serial No. 209,013.

*To all whom it may concern:*

Be it known that I, BRONSON H. SMITH, a citizen of the United States of America, and a resident of Brooklyn, Kings county, and State of New York, have invented certain new and useful Improvements in Motor-Vehicles, of which the following is a specification, reference being had to the accompanying drawings, forming a part thereof.

My invention relates to motor vehicles and its object is to provide a light parcel delivery vehicle of simple construction. More specifically it relates to a novel design and construction of a vehicle frame and to an improved manner of body suspension.

Another object of the invention is to provide means for air cooling an internal combustion engine located back of a part of the vehicle body.

In order that my invention may be thoroughly understood, I will now proceed to describe the same in the following specification, and will then point out the novel features thereof in appended claims.

Referring to the drawings.

Like characters of reference designate corresponding parts in all the figures.

Figure 1:
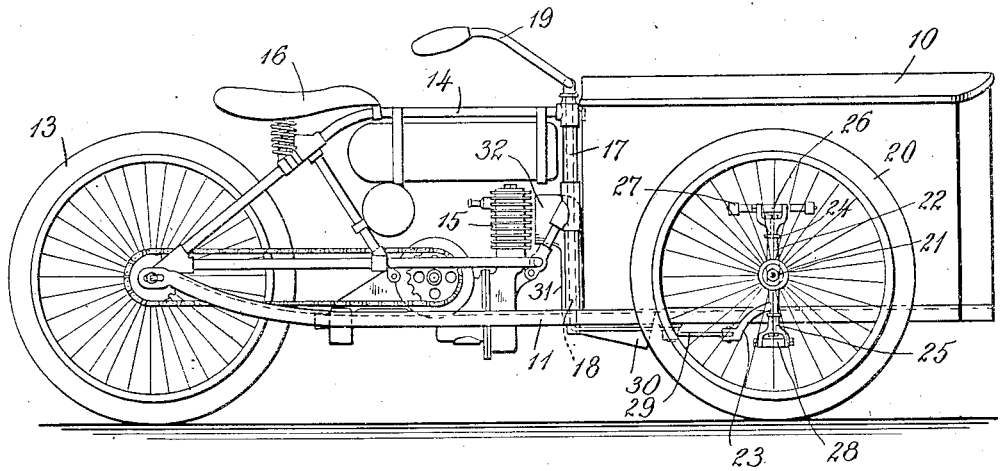
Figure 1 is a side elevation of a vehicle made according to and embodying my invention.

10 designates a box-like body at the forward part of the vehicle secured to side frames 11, the rear portions of which are bent toward each other to form supports for the axle 12 of a motor driven wheel 13. 14 designates another part of the frame, similar to that of a motor cycle, connected with the axle 12 and with the rear end of the body 10. This supports an internal combustion engine 15, a driver's seat 16 and other parts essential to the operation and control of the engine and its connection with the wheel 12, which parts form no part of this invention. 17 is a vertical post, a part of the frame 14 at the forward end thereof, directly back of the body 10, through which passes a steering post 18 to the upper end of which the steering handle-bars 19 are affixed.

Figure 2:
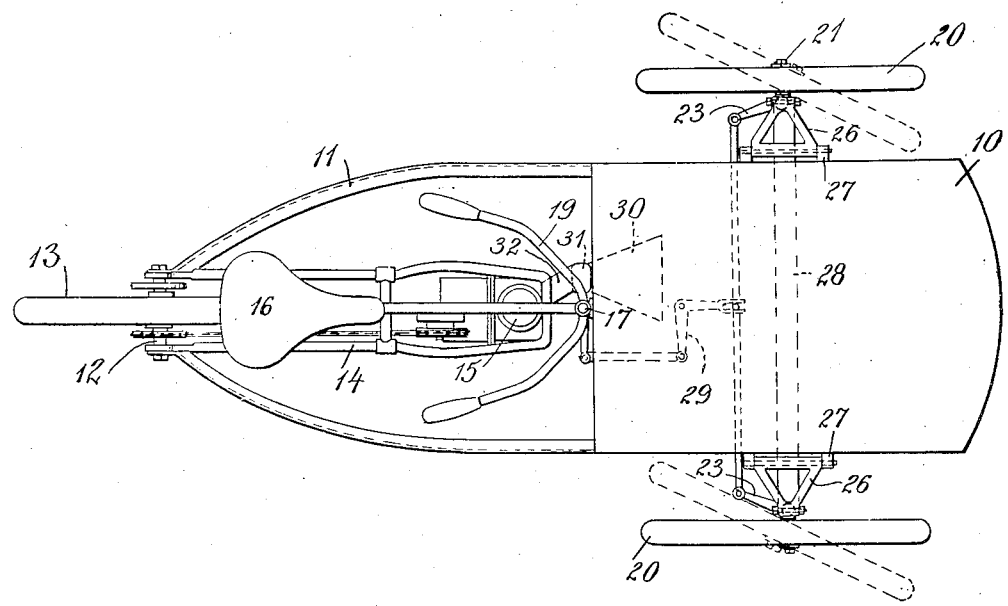
Fig. 2 is a plan view of the apparatus shown in Fig. 1.
Figure 3:
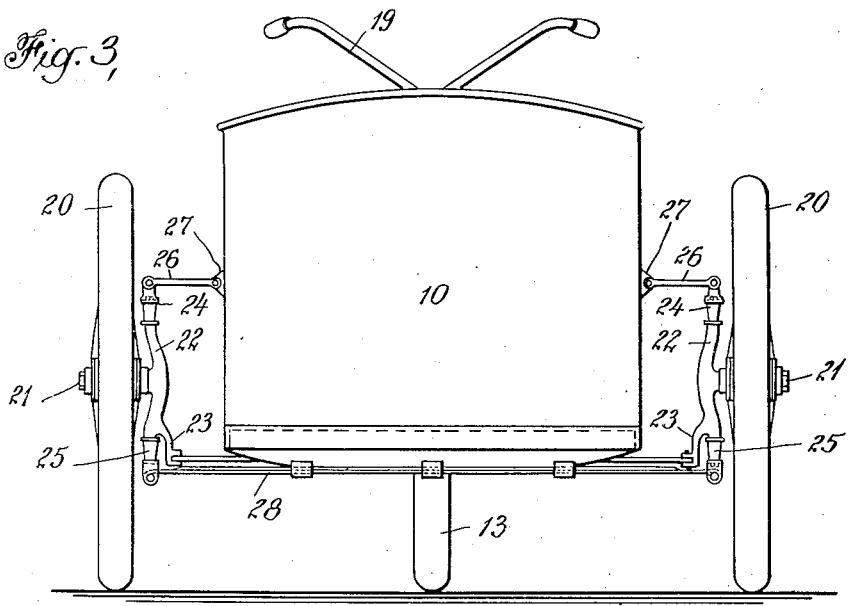
Fig. 3 is a front elevation of the same vehicle.

The front wheels 20 are mounted on stub axles 21 which extend horizontally from upright steering spindles 22 from the lower parts of which extend the steering arms 23. The upper and lower ends of the spindles 22 are constructed to form cylindrical shanks which rotatively fit in forks 24 and 25 respectively. The upper forks are pivotally connected with the ends of brackets 26, the other ends of which are pivotally connected with the vehicle body 10 at 27. The lower forks 25 are similarly connected with the opposite ends of transverse leaf springs 28 upon which rests the body 10 and to which the springs are suitably affixed. It is understood of course that there is suitable connecting mechanism between the steering post and the arms 23, such as indicated in Fig. 2 and designated generally by the reference numeral 29.

Figure 4:
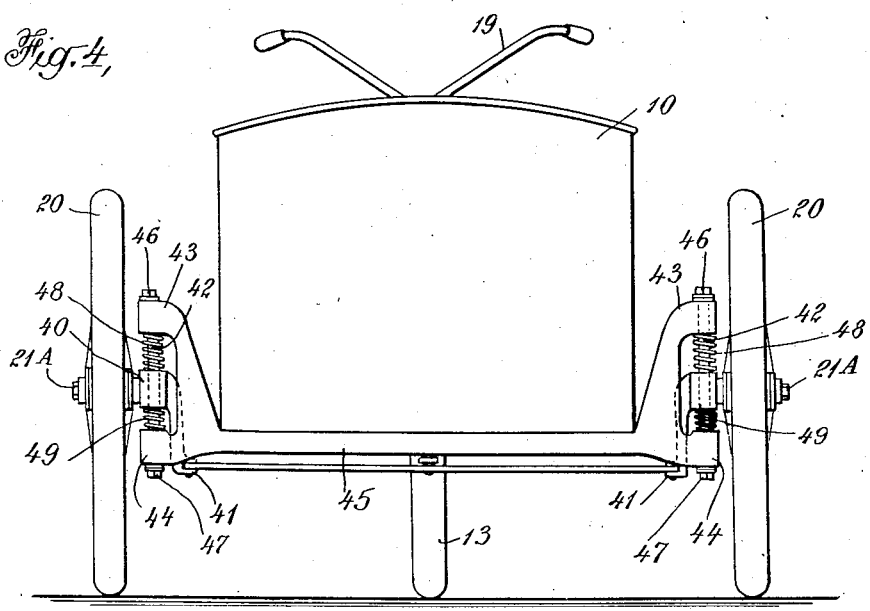
Fig. 4 is a front elevation of a similar vehicle, showing a preferred form of construction of the connections between the front wheels and the vehicle frame.

Another form of suspension for the vehicle on the forward wheels is shown in Fig. 4 in which the wheels 20 are mounted on stub axles 21ᴬ which extend from collars 40 from the opposite sides of which the steering arms 41 extend. Vertical rods 42 pass through these collars and through forked arms 43 and 44 of a cross frame 45, and are secured thereto as by nuts 46—47. Between the collars 40 and the arms 43 are interposed springs 48 which sustain such of the weight of the vehicle as is borne by the front wheels. Between the collars 40 and the arms 44 recoil springs 49 may be placed if desired.

In either of these structures the distance between the front wheels is extended, the points of spring suspension spread apart so that the maximum spring action is coincident with the axes of the steering spindles in one case and with the stub axle collars in the other case. Thus the stability of the vehicle is increased and at the same time provision is made for ample steering movement of the front wheels.

As the body 10 is in front of the engine 15 it cuts off the air current due to the movement of the vehicle, and in order to overcome this difficulty, an air scoop 30 is placed under the body with a duct 31 leading up to a flaring outlet 32 directed toward the ribbed cylinder of the engine.

Structures of preferred form and construction have been illustrated and described for the purpose of showing ways in which this invention may be used, but the inventive thought upon which this application is based is broader than these illustrative embodiments thereof, and I therefore intend no limitations other than those imposed by the appended claims.

What I claim is:

1. A vehicle having a frame, a motor-driven wheel near one end thereof, a pair of steering wheels near the other end thereof, said frame having forked arms at its opposite sides, each of said arms having a vertical guide rod affixed thereto, oscillatory collars surrounding said rods and vertically movable thereon, stub axles projecting from said collars, said steering wheels being rotatively mounted on said stub axles, steering arms projecting from said stub axles toward the center of the driven wheel, steering means intermediate the driven wheel and the steering wheels, and connections between said steering means and the steering arms, compression springs surrounding said guide rods between each of said collars and the upper fork of its respective arms, and cushioning springs also surrounding said guide rods between each of said collars and the lower fork of its respective arm.

2. A vehicle having a frame, a motor driven wheel near one end thereof, a pair of steering wheels near the other end thereof, forked arms at the opposite sides of the frame, substantially vertical guide rods carried by said forked arms, oscillatory collars surrounding said rods and vertically movable thereon, bearings for the steering wheels carried by said collars, steering means intermediate the steering wheels and driven wheel, steering connections from said steering means to the steering wheels, compression springs surrounding the guide rods between the collars and the upper forks and cushioning springs surrounding the guide rods between the collars and the lower forks of the forked arms.

In witness whereof, I have hereunto set my hand this 26 day of December, 1917.

BRONSON H. SMITH.